Dec. 25, 1962 D. K. HAILSTONE 3,070,203
ESCAPE CHUTE
Filed Nov. 24, 1959 2 Sheets-Sheet 1

INVENTOR
DUDLEY K. HAILSTONE

*Flehr & Swain*
ATTORNEYS

Dec. 25, 1962 D. K. HAILSTONE 3,070,203
ESCAPE CHUTE
Filed Nov. 24, 1959 2 Sheets-Sheet 2

INVENTOR.
DUDLEY K. HAILSTONE
BY
Flehr & Swain
ATTORNEYS 3,070,203
ESCAPE CHUTE
Dudley Kenneth Hailstone, Tiburon, Calif., assignor to Survival Equipment Corporation, San Francisco, Calif., a corporation of California
Filed Nov. 24, 1959, Ser. No. 855,037
9 Claims. (Cl. 193—25)

This invention relates to an improvement in escape chutes and particularly to escape chutes which are adapted to be used by persons escaping from an aircraft which has made a forced landing. Under such conditions, normal boarding ladders, etc., are not available and the escape apparatus must be available in the plane.

In such instances the aircraft will in all probability come to rest in an unconventional position. For example, in the event of the collapse of one of the landing wheels, either the tail or nose portion of the plane will come to rest at a greater than normal distance from the ground. Passengers seeking to escape from the plane will therefore experience considerable difficulty and possible injury if they leave the craft by jumping from a door or hatch in the elevated part of the plane.

The height of the escape hatch or door from the ground will vary depending upon the type of plane and the character of the accident. For example, in certain aircraft presently in use, and particularly the Boeing 707 and the Douglas DC-8, the fore and aft doors are normally approximately ten and twelve feet from the ground, respectively. However, in the event of a front wheel collapse, for example, the rear door of the DC-8 may be more than seventeen feet from the ground and the front door may be seven or more feet from the ground. Since these aircraft carry in excess of one hundred passengers and, further, since safety regulations require that all the passengers must be removed in the shortest possible period of time, it is apparent that all the doors and escape hatches, including those farthest from the ground, must be utilized with the result that each must be provided with an escape chute designed to operate efficiently, effectively and satisfactorily, regardless of the height of the door from the ground and/or the angle of the chute to the ground. Since the height of the door from the ground will vary with the type of accident each escape chute must be adapted to provide safe egress when used at angles up to 55°, and possibly greater.

Various attempts have been made to provide a commercial escape chute of this character. For example, one manufacturer has followed the teachings of Boyle United States Letters Patent 2,765,131 which discloses an escape chute comprising a flexible walled fluid distensible slideway. The device is more particularly characterized by the fact that three inflatable parallel tubes, when distended by internal pressure, form a fluid trussed beam having high resistance to bending strains. The slideway upon which the escapee rides is one of the fluid distended tubes and is characterized by the inventor as a slideway or fluid trussed beam of sufficient strength against bending to support against gravity the weight of an escaping person sliding upon it. Devices which are made in accordance with the disclosure of that patent have been relatively rigid and provided a straight surface down which the escapee rode. The very rigidity of the device gives it a trampoline action so that when a panicky escapee leaps from the hatch of a plane onto the device he may be thrown from it. Moreover there is nothing on such a device which tends to retard the escapee so that he contacts the ground without his slide having been broken. When the escape chute is at a sharp angle to the ground it is apparent that he will hit the ground with considerable velocity and suffer possible injury.

In the aforementioned Boyle patent the inventor distinguishes over the other type of conventional apparatus which is a fabric sheet-type of escape slide and he points out certain deficiencies in these devices which he alleges are inherent therein. The commercial form of this type of escape chute is disclosed in British Patent 805,696 which consists of a pair of fluid distensible side members which support between them a slideway of the fabric sheet-type commented upon in the aforesaid Boyle United States patent.

It is an object of this invention to provide an escape chute of the flexible fabric sheet-type which is adapted to be supported by a pair of parallel spaced inflatable tubular side supports and which is adapted to be used to effect the safe escape of a person regardless of the angle at which the chute is operated. With chutes of the fabric sheet-type illustrated and disclosed in the aforementioned British patent, it is desired that the side support members "break" to retard the slide of the escapee. However, as I have pointed out, such chutes must be operable at angles up to 55° and over. When the tubular side support members are inflated at a sufficiently low pressure to provide optimum escape conditions at a steep angle, with the resultant proper "break," the chute is not adapted to operate successfully at a lesser angle. The reason seems to be that when the device is inflated at a low pressure, it tends to operate properly ("break" and then reassume its normal position) for descent at a steep angle but when the angle is in the order of less than 40°, the device breaks but does not spring back or resume its normal position and it is frequently necessary that the escapee scramble off the end or over the sides of the chute.

When the chute is inflated to a pressure at which it will not tend to break, it will operate properly for use at angles of less than 40°, for example.

However, when a chute which is inflated to provide optimum escape conditions at a slight angle, is used at an angle of the order of 55° for example, it will not "break" and the escapee will slide rapidly to the ground without his slide being retarded or broken. The importance of the break cannot be minimized. It is desirable and very nearly imperative that the device "break" when it is used at a sharp angle since this breaking action tends to slow the escapee down and retard his descent. Further, after the chute has "broken" it should tend to resume its normal position with the result that it will tend to eject the escapee onto the lower end of the chute. Thus the "break," at a steep angle of descent, performs two purposes, that is it retards the escapee's descent and it facilitates his removing himself from the chute thus making way for the following escapee. However when the device is used at a lesser angle the device should not "break" since the "break" can offer certain disadvantages as have been previously pointed out, to wit: it retards the escapee when it is unnecessary to do so and, if the pressure in the sidewall members is insufficient, it will not tend to eject him.

It is a further object of this invention to provide a device of the fabric sheet-type which is supported between a pair of fluid distensible members which will operate properly, when the side walls are distended at predetermined pressure, regardless of the angle of the chute to the ground.

It will be apparent that in a catastrophe situation, which is the situation in which these chutes are most frequently used, there is no way of varying the pressure within the chute. All chutes must be operated at the same pressure regardless of the angle at which the descent is to take place, and must be inflated rapidly from the pressure system which either accompanys the chute or which is built into the plane.

More specifically, it is an object of this invention to provide an escape chute of this kind which will operate satisfactorily at a steep angle by permitting the fluid distensible side support members to "break" and which is so constructed that the fluid distensible side members will not "break" when the device is operated at a lesser angle.

It is a further object of this invention to provide an escape chute of this type which is provided with means normally urging it into a position at right angles to the longitudinal axis of the airplane and which will normally urge it into an angle with respect to the door or escape hatch of the plane. It is possible that when conventional escape chutes are discharged from the escape hatch or door, and inflated, wind or other conditions will force the device back under the plane so that when the chute is fully inflated it will be in an inoperative position. The means which I refer to previously in this paragraph are designed to prevent this from occurring and to force the chute into a normal operating position regardless of the wind or other conditions.

These and other objects and advantages of this invention will appear from the following specification taken in conjunction with the accompanying drawings in which.

Figure 1:
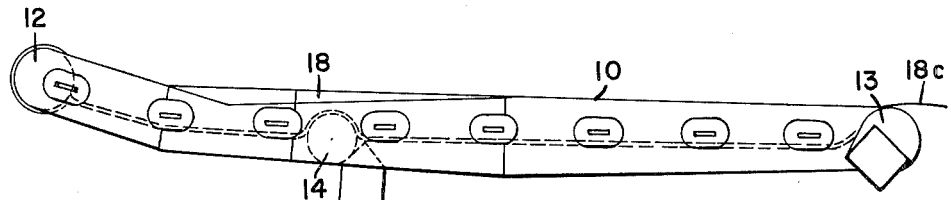
FIGURE 1 is a side elevational view of the escape chute incorporating my invention.
Figure 2:
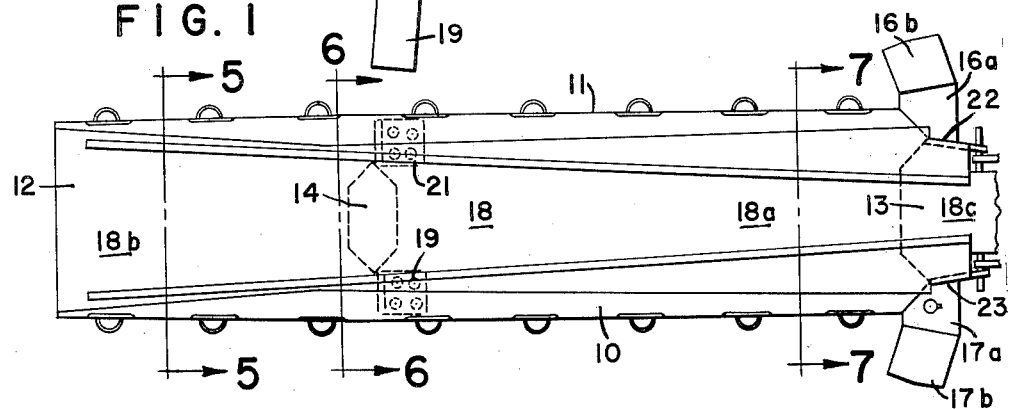
FIGURE 2 is a plan view of the device illustrated in FIGURE 1.

As illustrated in the drawings, my device consists of a pair of tubular inflatable side support members 10 and 11 which may be formed of rubber, fabric, or other deformable or resilient material. The ends of the side support members 10 and 11 are spaced or separated by a pair of end mmbers 12 and 13 which are likewise tubular and inflatable and which are in fluid communication with the side members 10 and 11. A tubular inflatable intermediate transverse member 14 is positioned between the two side members 10 and 11 and parallel to the end members 12 and 13 at a point about one-third of the distance between the lower end member 12 and the upper end member 13. Since the side, end and intermediate members are in fluid communication, the pressure in each is identical.

The side support members 10 and 11 are tapered from their upper ends at a point about one-third of the distance between the members 12 and 13 and about the point where the intermediate transverse member 14 separates the two.

The lower end member 12 is adapted to engage the ground. It will also be noted from FIGURE 1 that the lower end is normally offset upwardly with respect to the longitudinal axis of the member and, as viewed in FIGURE 1, if the plane defined by the top edges of the side members 10 and 11 were projected through the offset, it would pass through the transverse central axis of the end support member 12.

The upper end support member 13 is adapted to be supported adjacent an escape hatch or door of the plane and to engage the side of the fuselage of the aircraft at a point immediately below the door or opening and on the outside of the plane. It will be noted that the member 13 is provided with a pair of normally outwardly, downwardly and forwardly projecting side extensions 16 and 17 which are likewise in fluid communication with the member 13 so that they are inflated simultaneously therewith and to the same pressure. The purpose of the extensions 16 and 17 will more fully hereinafter be described. The outwardly extending portion of members 16 and 17 are referred to as 16a and 17a and the downwardly and forwardly extending portions are referred to as 16b and 17b.

The side support members 10 and 11 and the end support members 12 and 13 support a flexible sheet portion 18 which is secured to the members 10, 11, 12 and 13 in any suitable manner, as for example, by utilization of an adhesive in the dotted area shown.

Chute or slide member 18 comprises a deformable fabric sheet. It will be observed from the drawing that the sheet is secured to the side walls 10 and 11 and the end walls 12 and 13 in such a manner that the slideway which is created thereby is relatively flat near both the upper and lower ends but sags in the area between and that the greatest sag is generally at about the position of the intermediate transverse member 14. The purpose of the sag in the slide member 18 will more fully hereinafter be described.

I also provide a pair of inflatable and fluid distensible stubby legs 19 and 21 which are formed of the same material as the members 10 through 17, inclusive, and which are in fluid communication therewith. They are parallel and spaced apart and extend downwardly generally at right angles to the plane defined by the upper surfaces of the side support members 10 and 11. Their length will vary with the length of the chute but I have found that legs which are three feet long function satisfactorily on a twenty foot long chute. The purpose of these fluid distensible inflatable legs 19 and 21 will more fully hereinafter be described.

The entire apparatus is adapted to be secured to the aircraft by means of straps 22 and 23 and an extension 18c of the slide surface which are secured to the assembly in any suitable manner but which preferably extend over the upper surface of the end support members 13 to some securing mechanism within the plane. The straps 22 and 23 should, under ordinary conditions, be sufficiently taut that there is no open space between the side of the aircraft and the end support member 13 and so that the extension 16 and 17 will engage the side of the aircraft and serve to position the assembly laterally and will tend to urge the chute outwardly and away from the aircraft rather than possibly to permit the same to hang straight down or to be blown back to an inoperative position beneath the aircraft.

The advantages of the construction which I have described and the mode of operation of the various components may best be understood by a description of the operation of the device which follows.

Figures 3, 4:
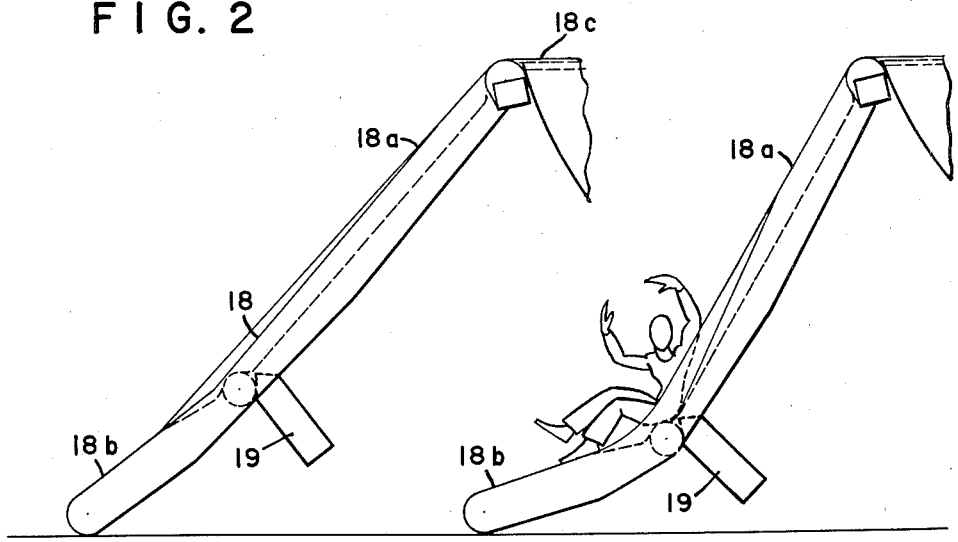
FIGURE 3 is a side elevational view of the escape chute as described in FIGURE 1 when the same is used to permit the escape of a person at a sharper angle.
FIGURE 4 is a view of the device illustrated in FIGURE 3 with an escapee thereon illustrating the break in the device when used at a sharper angle.
Figure 5:
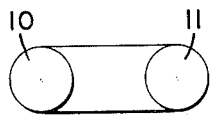
FIGURE 5 is a cross-sectional view of the device taken along the line 5—5 of FIGURE 2.
Figure 6:
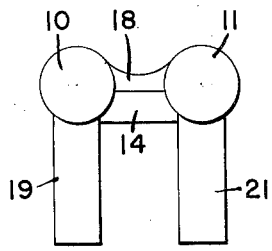
FIGURE 6 is a cross-sectional view taken along the line 6—6 of FIGURE 2.
Figure 7:
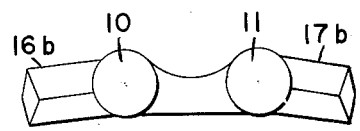
FIGURE 7 is a cross-sectional view taken along the line 7—7 of FIGURE 2.
Figure 8:
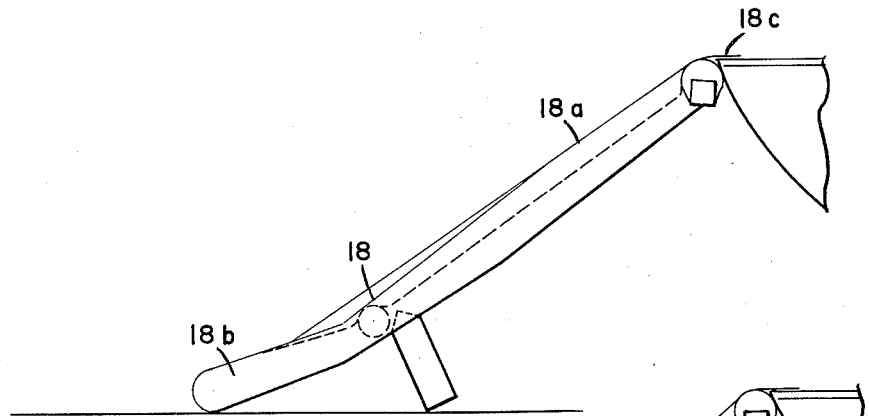
FIGURE 8 is a side view of the device illustrated in FIGURES 1 and 2 showing its use when it is used to evacuate persons at a shallow angle.
Figure 9:
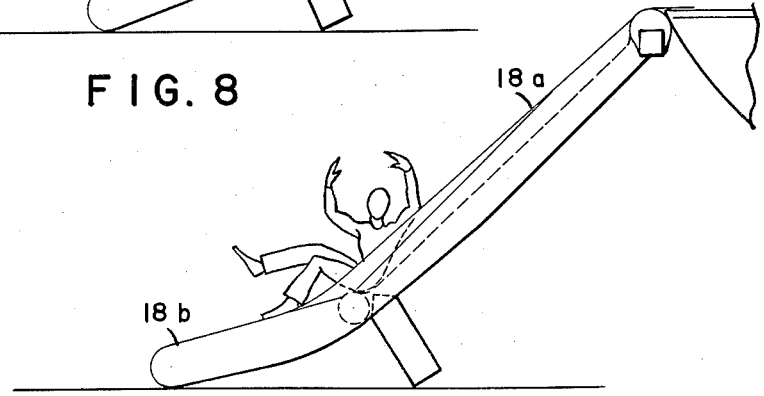
FIGURE 9 is a view of the device illustrated in FIGURE 8 illustrating its use by an escapee at a slight angle and showing that the device does not "break" when its supporting legs engage the ground.

Let it be assumed that the aircraft has landed in an unconventional position in which one of the escape hatches is at a substantial height above the ground as, for example, a height of seventeen feet as would be the case if a Douglas DC–8 were to suffer a front wheel collapse. The doorway is opened. My escape chute, which is adapted to be positioned in any suitable sufficiently large recess in the plane, is removed from the recess and is hung outside the door and supported solely by straps 22 and 23 and the extension 18c of the slide apron. The apparatus is connected to a suitable source of fluid under pressure and when the device is flung from the open hatch fluid under pressure will be forced into the members 10 through 17. Let it be assumed that the chute which is illustrated in the drawings is 21 feet in length. The fluid pressure within the device would be in the order of 1.75 pounds per square inch. As the fluid flows into the unit the various parts of the unit tend to distend in the following sequence: The upper end support member 13 and the extensions 16 and 17 tend to inflate first. The upper portions of the side support members 10 and 11 then tend to inflate and the lower support member 12 and the bottom ends of the side support members 10 and 11 and the legs 19 and 21 tend to inflate more or less simultaneously. It will be apparent therefore that as the device hangs from the side of the aircraft the downwardly and forwardly extending portions 16a and 17a of the extensions 16 and 17 will engage the side walls of the fuselage and tend to swing the chute outward and to the left as viewed in FIGURES 3 and 4 rather than to permit the device to inflate in a more or less vertical position or, in a position under the airplane, or to the right, as viewed in FIGURES 3 and 4. Also, the outwardly extending portions 16b and 17b of extensions 16 and 17, engage the side walls of the fuselage simultaneously and they will urge the chute into a position more or less laterally and at right angles to the plane of the side wall of the aircraft at that point. As illustrated particularly in FIGURES 3 and 4, the angle of the chute with respect to the ground is approximately 50° and the legs 19 and 21 do not engage the ground. It will further be noted, as indicated in FIGURE 4 that the chute or slide area 18 is substantially flat near the upper and lower ends of the chute but that it sags substantially at about the general area of the intermediate transverse member 14. There are several reasons for the sag in the deformable chute or slide 18. In the first place, the sag tends to create a longitudinal trough between the side support members 10 and 11 which supports the escapee so that he does not tend to fall over the side of the device at any point above the ground. Secondly, and perhaps more important, is the fact that the sag increases as the person slides down the chute. This creates a retarding area since the frictional engagement between the body of the escapee and the side support members 10 and 11 and the sheet 18 is increased as the sag increases. It should be pointed out that the sag is enhanced by the tendency of the side support members 10 and 11 to rotate about their longitudinal axes. It will be apparent from FIGURE 6 that the intermediate transverse member 14 is secured to the members 10 and 11 generally along their lower halves and that the members 10 and 11 extend substantially above the surface of the top wall of the member 14. Thus there is a tendency of the two members 10 and 11 to roll toward each other about the member 14 which increases the gripping effect of the side support members 10 and 11.

The more or less flat portions 18a and 18b of the chute or slide member 18 near the top and bottom thereof, respectively, also serve a useful function. The section near the upper part of the chute 18 serves to provide an unrestricted slide area so that the escapee is removed from the aircraft as rapidly as possible. This gets him out of the way of the other passengers who follow him and, furthermore, serves to get him away from any wreckage, fire, etc. The flat section 18b near the bottom of the chute facilitates the removal of the passenger from the chute.

As the escapee slides down the chute the side support members 10 and 11 tend to "break" or to yield against the weight of the person sliding down the chute. This break increases the sag in the slide member 18 and thus serves further to retard the downward progress of the escapee both by increasing the sling effect which prevents the escapee from falling over the side of the device and which also increases the engagement between the escapee and the chute and the side walls 10 and 11 thereof. However the tendency of the side support members to "break" is soon overcome by their tendency to return to a normal position under the influence of the fluid pressure therein. This tendency to return to normal position creates a so-called "leaf spring effect" which tends to eject the person from the sling or sag in the chute 18 onto the flat portion 18b adjacent the bottom of the device. This tends to remove the escapee from the chute as promptly as possible.

It will be noted that in the previously described operating condition of the device, the legs 19 and 21 did not engage the ground and, when the device is so utilized they do not contribute to or prevent the "break" of the device or to its support. However their utility and the necessity of their being incorporated into this device will be made clear from the description of the device when it operates under another set of conditions.

Let it be assumed that the craft crashes in such a manner that the escape hatch or door is relatively near to the ground, as, for example, at a height of twelve feet which may be too high to permit the average passener to jump safely. In adidtion the area immediately underlying the plane may be rough and thus present a hazard should persons drop from the door.

The device which is to be utilized under these conditions must be the identical chute which has previously been described in connection with the escape from a greater height. In other words, the fluid pressure within the apparatus will be identical, it will be supported from the hatch in the same manner and its length will be identical with the following important differences, however. The angle of the chute with respect to the ground will be in the neighborhood of 30°. Secondly, and perhaps more important, the legs 19 and 21 will engage the ground. As the escapee leaps upon the chute he strikes the upper flat area 18a and slides into the sagging area. However the tendency of the side support members 10 and 11 to "break" is overcome by the fact that the legs 19 and 20 engage the ground and support the side support members 10 and 11 against bending. Thus the escapee slides over the upper flat area 18a into the sagging area and then onto the lower generally flat area 18b.

Thus, it will be apparent that I have provided a single escape chute which may be utilized under extreme conditions and degrees of angularity to provide a simple, safe means of egress for an escaping passenger. As I have previously pointed out, prior devices operated more or less on the rule of thumb, the greater the angle the less the required pressure; the less the angle the greater the required pressure. This is not true in the use of my device. The same pressure is used regardless of the angle. This is an essential requirement since the pressure within the chute must, for practical purposes, be the same whether the device is to be used at a sharp or a low angle.

Thus my construction permits optimum use of both the "break" and sag when the device is being used at a steep angle of descent.

When the device is used at a lesser angle the "break" in the side members 10 and 11 which is so essential to the operation of the device when it is used at a steep angle, is eliminated by the action of the legs 19 and 21. The need for retarding the escapee no longer exists but the need of the sag to prevent him from falling over the side remains. Thus the sag is utilized under all circumstances.

The extensions 16 and 17 center the device, so to speak, with respect to the plane and insure that the device extends away from the plane at the proper angle which practically insures that any passenger who leaps from the plane will engage the escape chute. The extensions 16 and 17 also serve to force the device, while it is being inflated, into the proper escape position away from the plane.

The utilization of the straps 22 and 23 and the upper extension of the apron which hold the device against the plane also serves to prevent the device from falling away from the plane, or, in other words, tends to hold the upper cross support member 13 in intimate engagement with the side of the plane so that there is no gap between the two. It has been found that a gap at this point forms a hazard in that a passenger may put his foot in the gap. In addition the sight of an opening between the chute and the plane may tend to overcome the escapee's confiidence in the device.

I claim:

1. In a device of the character described, a pair of tubular inflatable side support members, two tubular inflatable end support members joining the ends of said side support members and adapted to hold the side support members in spaced substantially parallel relationship when they are inflated, an intermediate tubular inflatable transverse member of smaller diameter than said side and end support members and in fluid communication with said side support members and parallel to said end support members, a deformable fabric sheet secured along the intended upper edges of said side and end support members and presenting substantially flat surfaces at its intended upper and lower ends and presenting a sag area therebetween.

2. In a device of the character described, a pair of tubular inflatable side support members tapering generally from their ends to an area enlarged diameter at a zone near the intended lower end of the device, two tubular inflatable end support members joining the ends of said side support members and adapted to hold the side support members in spaced substantially parallel relationship when they are inflated, an intermediate tubular inflatable transverse member of smaller diameter than said saide and end support members and in fluid communication with said side support members at a point adjacent said area of enlarged diameter and parallel to said end support members, a deformable fabric sheet secured along the intended upper edges of said side and end support members and presenting substantially flat surfaces at its intended upper and lower ends and presenting a sag area therebetween, a pair of inflatable and fluid distensible downwardly extending legs in fluid communication with said side support members.

3. In a device of the character described, a pair of tubular inflatable side support members, two tubular inflatable end support members joining the ends of said side support members and adapted to hold the side support members in spaced substantially parallel relationship when they are inflated, an intermediate tubular inflatable transverse member of smaller diameter than said side and end support members and in fluid communication with said side support members and parallel to said end support members, a deformable fabric sheet secured along the intended upper edges of said side and end support members and presenting substantially flat surfaces at its intended upper and lower ends and presenting a sag or loose area therebetween, said upper end support member being provided with a pair of normally outwardly, downwardly and forwardly projecting side extensions which are in fluid communication with said end support member.

4. In an escape chute of the character described for use with an aircraft to make emergency departure therefrom, a pair of tubular inflatable side support members, a pair of tubular inflatable end support members joining the ends of said side support members and adapted to hold the side support members in spaced substantially parallel relationship when they are inflated, an intermediate tubular inflatable transverse member of smaller diameter than said side and end support members and in fluid communication with said side support members and parallel to said end support members, a deformable fabric sheet secured along the intended upper edges of said side and end support members and presenting substantially flat surfaces at its intended upper and lower ends and presenting a sag area therebetween, and means associated with said chute to position the same laterally with respect to the aircraft, said means comprising a pair of normally outwardly projecting side extensions which are in fluid communication with the intended upper end support member.

5. In a device of the character described, a pair of inflatable side support members, an inflatable end support member joining the intended upper ends of said side support members, a second end support member joining the intended lower ends of said side support and end support members adapted to hold the side support members in spaced relationship when they are inflated, an intermediate inflatable transverse member in fluid communication with said support members and parallel to said end support members, a deformable fabric sheet secured along the intended upper edges of said side and end support members and presenting substantially flat surfaces at its intended upper and lower ends and presenting a sag area therebetween, the upper end support member being provided with a pair of outwardly projecting side extensions which are in fluid communication therewith.

6. In an escape chute of the character described, a pair of tubular inflatable side support members, a pair of tubular inflatable end support members joining the ends of said side support members and adapted to hold them in spaced substantially parallel relationship when they are inflated, a deformable fabric sheet secured along the intended upper edges of said side and end tubes and presenting substantially flat surfaces at its intended upper and lower end regions and presenting a sag area intermediate said regions to provide a constricted region along a limited intermediate extent of said chute, said constricted region being activated by the weight of a person descending said chute to brake the descent thereof, and means associated with said chute and extending laterally therefrom tending to position the chute laterally of an aircraft and tending to urge the same outwardly and away from an aircraft.

7. In an escape chute of the character described, a pair of tubular side support members, a pair of tubular inflatable end support members joining the ends of said side support members and adapted to hold them in spaced substantially parallel relationship when the are inflated, a deformable fabric sheet secured along the intended upper edges of said side and end tubes and presenting substantially flat surfaces at its intended upper and lower end regions and presenting a sag area intermediate said regions to provide a constricted region along a limited intermediate extent of said chute, said constricted region being activated by the weight of a person descending said chute to brake the descent thereof, and means associated with said chute and extending laterally therefrom tending to position the chute laterally of an aircraft, and legs intermediate the ends of said chute adapted to engage the ground when said chute is used at a flat angle.

8. In an escape chute of the character described, a pair of tubular inflatable side support members, a pair of tubular inflatable end support members joining the ends of said side support members and adapted to hold the side support members in spaced substantially parallel relationship when they are inflated, the ends of said tubular side support members being of substantially the same diameter and increasing in diameter to a point of greatest diameter at about two-thirds of the way down the said side support members from their intended upper ends, the intended lower one-third ends of said tubes being offset generally upwardly from a plane defined by the intended upper edges of said side support members a deformable fabric sheet secured along the intended upper edges of said side and end support members and presenting substantially flat surfaces at the intended upper and lower end regions thereof and presenting a sag area intermediate said end regions.

9. In an escape chute of the character described, a pair of tubular inflatable side support members, a pair of tubular inflatable end support members joining the ends of said side support members and adapted to hold the side support members in spaced substantially parallel relationship when they are inflated, the ends of said tubular side support members being of substantially the same diameter and increasing in diameter to a point of greatest diameter at about two-thirds of the way down the said side support members from their intended upper ends, the intended lower one-third ends of said tubes being offset generally upwardly from a plane defined by the intended upper edges of said side support members, a deformable fabric sheet secured along the intended upper edges of said side and end support members and presenting substantially flat surfaces at its intended upper and lower regions thereof, said side support members adapted to yield under weight on said deformable fabric sheet and then to return to normal condition and to eject the weight from said sheet over the intended lower end region thereof.

References Cited in the file of this patent

UNITED STATES PATENTS

| | | |
|---|---|---|
| 1,027,437 | Ridgway | May 28, 1912 |
| 2,270,437 | Herendeen | Jan. 20, 1942 |
| 2,765,131 | Boyle | Oct. 2, 1956 |
| 2,936,056 | Heyniger | May 10, 1960 |

FOREIGN PATENTS

| | | |
|---|---|---|
| 580,453 | Canada | July 28, 1959 |